W. F. TAYLOR.
DIFFERENTIAL GEARING.
APPLICATION FILED MAY 19, 1917.
1,271,101.
Patented July 2, 1918.
2 SHEETS—SHEET 1.
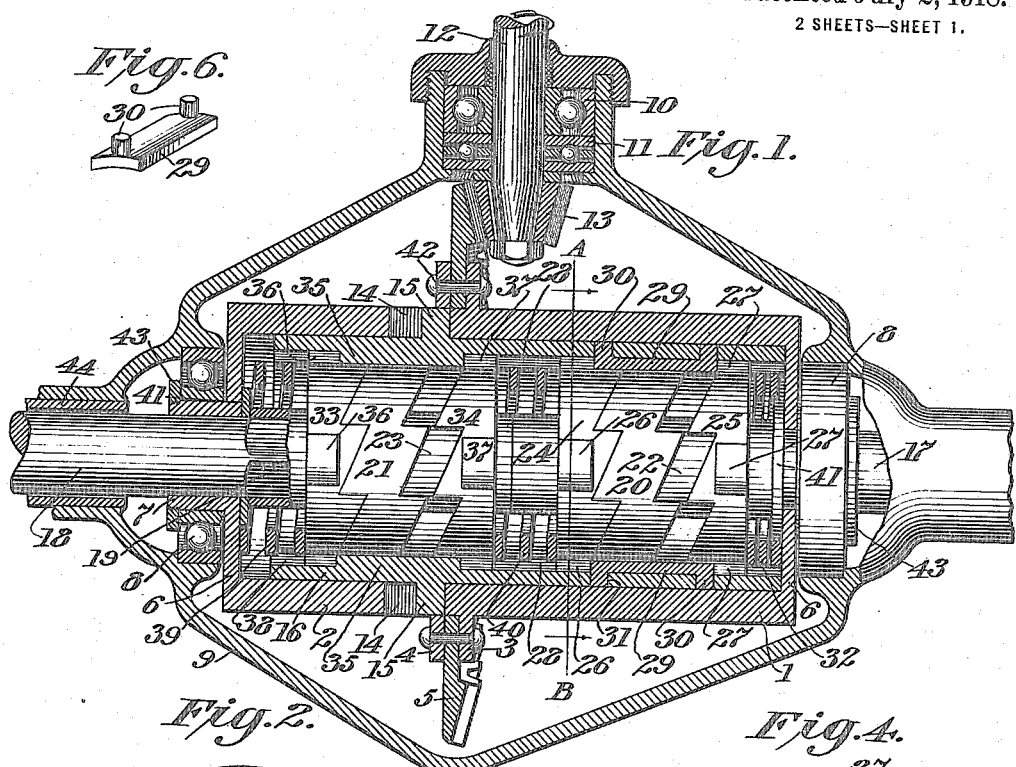
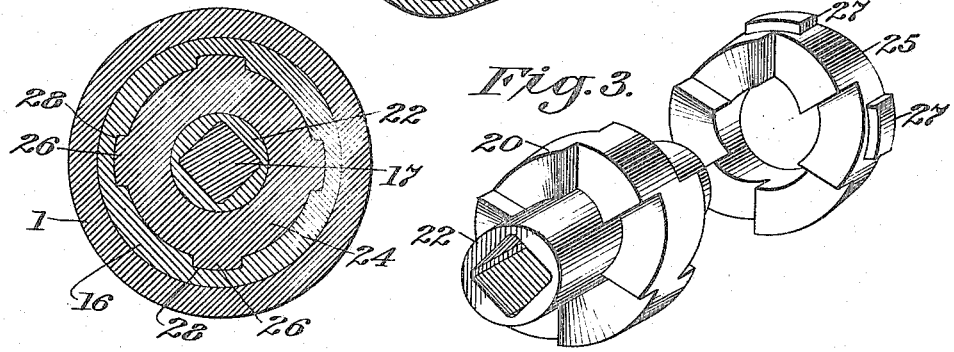
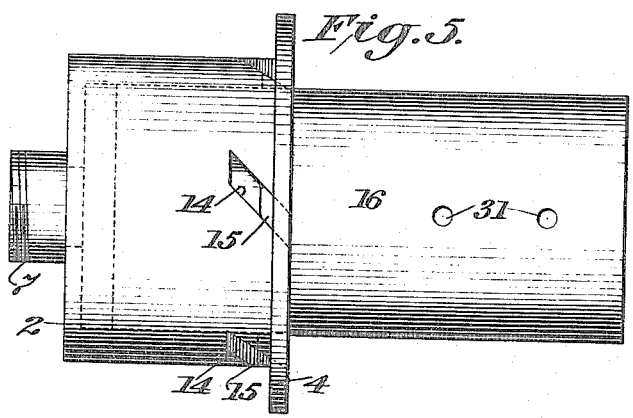
Inventor
William Florian Taylor
by
Attorney

W. F. TAYLOR.
DIFFERENTIAL GEARING.
APPLICATION FILED MAY 19, 1917.

1,271,101.

Patented July 2, 1918.
2 SHEETS—SHEET 2.

Inventor
William Florian Taylor
by
Attorney

UNITED STATES PATENT OFFICE.

WILLIAM FLORIAN TAYLOR, OF EL RENO, OKLAHOMA.

DIFFERENTIAL GEARING.

1,271,101.　　　　　Specification of Letters Patent.　　Patented July 2, 1918.

Application filed May 19, 1917. Serial No. 169,714.

*To all whom it may concern:*

Be it known that I, WILLIAM FLORIAN TAYLOR, a citizen of the United States, residing at El Reno, in the county of Canadian and State of Oklahoma, have invented a certain new and useful Improvement in Differential Gearing, of which the following is a full, clear, and exact description.

The object of this invention is to provide simplified means for giving differential movement to the live axles or to the countershafts of motor vehicles, without the employment of the usual spur or bevel gears, and of such character as to be automatic in action and non-stalling, and apply the power of the motor to whichever wheel has traction, and also allow for compensating movement in going forward or reversing.

The invention consists of a differential gear in which each of the adjacent ends of a divided axle shaft has applied to it so as to turn therewith, a two-faced ratchet adapted to be engaged by one or the other of a pair of ratchets loose on said ends, but which may be connected to turn with a rotating part surrounding the said ends and their ratchets to effect the forward or reverse movement of the driven vehicle or machine, as I will proceed now to explain and finally claim.

Figure 7:
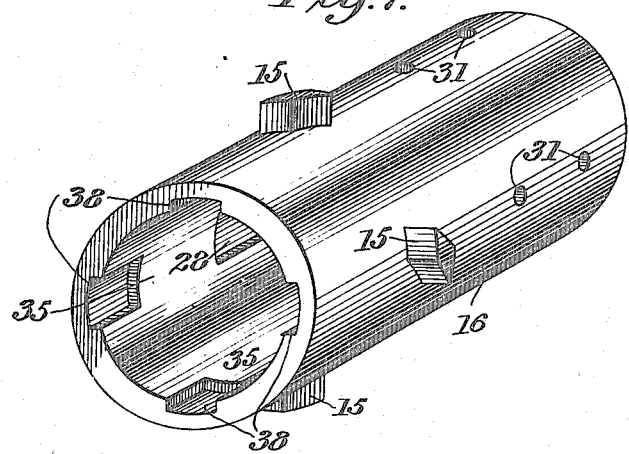
Figure 8:
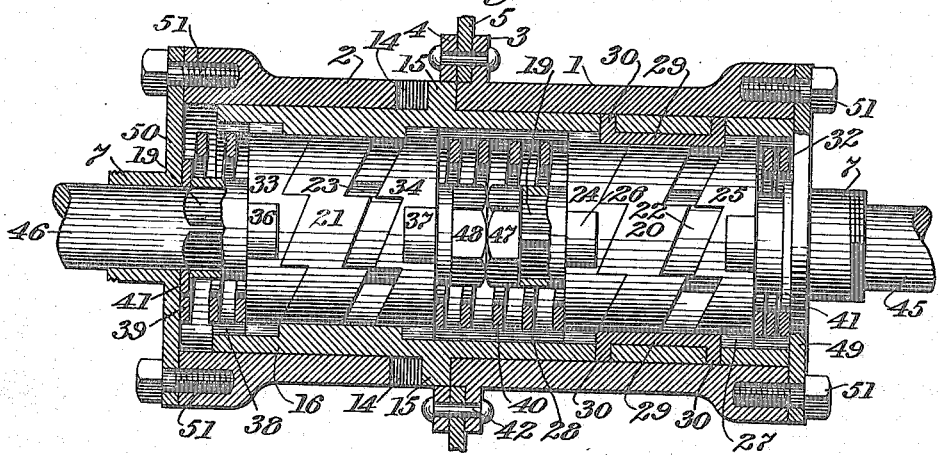

In the accompanying drawings illustrating the invention, in the several figures of which like parts are similarly designated, Figure 1 is a longitudinal section, with the ratchets in elevation, showing the invention applied to a motor vehicle gear having full-floating rear axles. Fig. 2 is a cross-section on the line A B, of Fig. 1. Fig. 3 is a perspective view of one of the double-faced ratchets, and Fig. 4 is a perspective view of one of the coöperative ratchets, detached. Fig. 5 is an elevation of the left-hand portion of the differential housing and the right-hand portion of the shifting sleeve showing particularly the slot and lug connection between the two. Fig. 6 is a perspective view of a form of ratchet stop-key. Fig. 7 is a perspective view of the shifting sleeve. Fig. 8 is a longitudinal section illustrating the invention as applied to a half or three-quarter floating axle, and more particularly the manner of retaining partly-floating axles in the differential assembly.

It is to be noted at the outset, that the invention is not limited to details of construction, and its principle may be embodied in various modifications of the structure herein illustrated and explained, so long as the essential features as hereinafter severally claimed are retained. With this statement I will proceed now to explain the invention as illustrated in the drawings.

The differential housing is formed in two parts 1 and 2, provided with flanges 3 and 4, respectively, by which they are secured together. Between these flanges is secured the usual large bevel gear 5. The ends 6 of the housing are provided with hubs 7 and these turn in suitable bearings 8 in the differential casing 9, which may be and is herein shown as of any usual or approved construction. Mounted in bearings 10 and 11 in the casing is the stub-shaft 12 provided with the beveled driving pinion 13 in mesh with and adapted to impart motion to the gear 5, which turns the housing.

The part 2 of the housing is provided at its flanged end with the helical slots 14, four, more or less, in number, and into these slots project lugs 15 on a shifting sleeve 16, which is mounted within the housing and shorter than it and capable of a limited longitudinal sliding movement therein and also a turning movement within the limit of movement of its lugs 15 within the helical slots 14.

Projecting into the housing at its opposite ends are the axle shafts 17 and 18 having their inner ends 19 squared, and upon these squared ends are mounted double-faced ratchets 20 and 21 having hubs 22 and 23 projecting therefrom on opposite sides, these ratchets turning with the shafts. The teeth on the opposite faces of these ratchets are arranged so as to permit the turning of the shafts in opposite directions.

Loosely mounted on the hub 22 of the ratchet 20 and on opposite sides of said ratchet, are forward and reverse driving ratchets 24 and 25, respectively, and these ratchets are provided on their peripheries with four, more or less, splines 26 and 27, respectively, and these splines engage corresponding grooves 28 extending longitudinally on the inside of the sleeve 16, so as to cause the ratchets to turn with the sleeve. The movement of the ratchets 24 and 25 toward the double-faced ratchet 20 is limited by means of stop-keys 29 arranged in the grooves 28, and provided with lugs 30 engaging holes 31 in the sleeve 16 to hold the keys in proper relation to the ratchet 20. The ratchet 25 is backed up by and forced into relation with the keys 29 by means of a helical spring 32 which bears against the outer plain face of the ratchet and the end of the housing 1.

On the hub 23 of the ratchet 21 are loosely mounted forward and reverse driving ratchets 33 and 34, similar in construction and operation to the ratchets 24 and 25, respectively, but instead of using keys 29 to limit their movement toward the ratchet 21, stops 35 are formed integral with the sleeve 16 against the opposite ends of which the splines 36 and 37 of the ratchets 33 and 34, respectively, abut. The splines 36 slide in grooves 38 and the splines 37 slide in the grooves 28. The ratchet 33 is backed up by a spring 39 similar to the spring 32. The ratchets 24 and 34 are held in engagement with the keys 29 and stops 35 respectively by a spring 40 interposed between them and encircling the abutting ends of the hubs of the ratchets 20 and 21.

A washer 41 is provided at each end of the housing to take the end thrust of the ratchets 20 and 21.

The differential is assembled in the following manner:—The ratchet 21 is slipped into the sleeve 16 from the right-hand end and then the ratchet 34 is slipped in from the same end, with its splines 37 engaging the grooves 28, and it is positioned upon the hub 23 of ratchet 21. Then spring 40 is placed in position, resting upon the back face of ratchet 34. Then ratchet 24 is slipped into the sleeve with its splines 26 engaging the grooves 28. The keys 29 are then put in position in the grooves 28, the ratchet 24 being depressed upon the spring 40 to make this possible, and after the keys are in place, the pressure on ratchet 24 may be released to thus hold the keys in position. Then ratchet 20 is slipped into the sleeve and its hub 22 slipped through the central opening in ratchet 24. Ratchet 25 is next positioned in the sleeve with its splines 27 engaging the grooves 28. Finally ratchet 33 is positioned in the left-hand end of sleeve 16 with its splines 36 engaging the grooves 38. This completes the assembly of the ratchet mechanism inside of the sleeve 16. When this is accomplished the washer 41 is placed in the half 2 of the housing and spring 39 is also put in. Then the sleeve with the ratchet parts assembled therein is slipped into this part of the housing, and the lugs 15 forced into engagement with the slots 14. A washer 41 and spring 32 are placed in the part 1 of the housing and large bevel gear 5 is placed in position against flange 3, and then this part of the housing is slipped over the right-hand end of sleeve 16 and connected with part 2 of the housing by means of the flanges 3 and 4 and suitable bolts or rivets 42. The bearings 8 may then be placed on the hub 7 of the housing and retaining rings 43 applied thereto, and the whole differential unit placed within the differential casing 9, the bevel pinion 13 being positioned and adjusted with relation to the bevel gear 5 in the usual manner.

The parts being thus assembled, the axle shafts may be slipped in through the wheel hubs and axle tubes 44 and the squared ends 19 inserted into the square openings in the hubs 22 and 23 of ratchets 20 and 21, respectively.

It will be observed that the hubs of the double-faced ratchets 20 and 21 abut against one another at their adjacent ends and the opposite ends of these hubs abut against the thrust washers 41, so that there is no endwise motion of these double-faced ratchets.

The operation of the device is as follows:—When the vehicle is moving forward, the shaft 12 will turn in the direction indicated by the arrow, and this through the bevel pinion 13 will drive the large bevel gear 5 to turn the housing 1, 2, of the differential in the forward drive direction. This movement of the housing forces the lugs 15 into the inner ends of the slots 14 and causes the ratchets 25 and 34 to be disengaged from the ratchets 20 and 21, respectively, and allows the ratchets 24 and 33 to engage ratchets 20 and 21 under the pressure of springs 40 and 39, respectively, thus turning the ratchets 20 and 21 in the forward speed direction and with them the axle shafts 17 and 18.

When it is desired to reverse the direction of motion of the vehicle, the shaft 12 will be rotated in the direction opposite to that indicated by the arrow, and consequently the housing will be rotated in the opposite direction, thus forcing the lugs 15 into the outer ends of the slots 14 and forcing the ratchets 24 and 33 out of engagement with ratchets 20 and 21, respectively, and allowing the ratchets 25 and 34 to engage ratchets 20 and 21 under the pressure of springs 32 and 40, respectively, thus imparting the reverse rotation to the ratchets 20 and 21 and through them to the axle shafts 17 and 18.

In turning a corner, or under other conditions where one driving wheel must turn faster than the other, the differential action of the device takes place. For example, suppose that the vehicle is turning to the left. This will cause the right wheel to turn faster than the left and consequently the right axle shaft 17 will turn faster than the left axle shaft 18. Axle shaft 18 turns at the same speed as the housing but axle 17 turns at a greater speed, and therefore ratchet 20 will turn faster than ratchet 24 for the reason that the former is fast on shaft 17 and the latter is turned by the housing, and the result is that the teeth of ratchet 20 will ride over the teeth of ratchet 24 and force ratchet 24 back against the pressure of spring 40.

When coasting, or under other conditions where the vehicle wheels or the axle shafts are driving, ratchets 20 and 21 turn faster than housing 1, 2. This movement shifts lugs 15 into the outer ends of the slots 14 and forces ratchets 24 and 33 out of mesh with ratchets 20 and 21, and allows ratchets 25 and 34 to engage the right-hand teeth on the ratchets 20 and 21. This position of the ratchets is exactly similar to the position assumed by them when the vehicle is reversed. This is assuming that the engine is not declutched from the rear wheels. With the differential in the above described position and with the wheels driving the motor, suppose for example, that the vehicle is turned to the right: this will cause the right wheel to turn slower than the left wheel, and consequently the right axle shaft 17 will turn slower than the left axle shaft 18. Axle shaft 18 turns at the same speed as the housing, but axle shaft 17 turns slower, and therefore ratchet 20 will turn slower than ratchet 25, for the reason that ratchet 20 is fast to the axle shaft 17 while ratchet 25 is fast to the housing, and the result is that the teeth of ratchet 25 will slide over the teeth of ratchet 20. This forces ratchet 25 back against the pressure of its spring 32.

The construction above described is applicable only to live axles of the full-floating type, but it may be modified so as to adapt it for use with live axles of the half or three-quarter floating type, in which it is necessary to positively retain the ends of the axle shafts within the differential. I have shown a modification in Fig. 8 which provides means for adapting the differential of this invention to axles of that type. In this construction the axle shafts 45 and 46 are square at their inner ends as in the former case, and the ratchets 20 and 21 are mounted on them in the same manner as heretofore described. But the inner ends of the axles are extended through the hubs of the ratchets 20 and 21 and are reduced and screwthreaded to receive nuts 47 and 48. The parts 1 and 2 of the casing instead of having their ends closed, are made open from end to end, and provided with caps or covers 49 and 50 adapted to be suitably secured to the parts 1 and 2 of the housing by means of cap-screws 51, or stud-bolts and nuts, or other suitable fastening means. Thus it will be seen that when the differential is assembled with the axle shafts therein, the shafts cannot pull out of the differential and thus cause the running off of a wheel or the breaking of a shaft, because they are held in fixed relation to the differential by means of the nuts 47 and 48 abutting against the ends of the hubs of the ratchets 20 and 21 and these in turn abutting against the washers 41 which are in contact with the caps or covers 49 and 50 of the housing.

The method of assembling the modified form of the differential would seem to require no detailed description, in view of the description in regard to the assembling of the differential for the full-floating type of axle.

The operation of the modified form of the invention is the same in all respects as the operation previously described herein.

The housing of the respective forms described may be made interchangeable.

What I claim is:—

1. A differential gearing, comprising a driving member and two driven members, a double-faced ratchet mounted on each of said driven members, a pair of ratchets mounted to coöperate with each of said double-faced ratchets and driven by said driving member, and means for effecting the interengagement of one of each of said pairs of ratchets with said double-faced ratchets to drive said driven members.

2. A differential gearing, comprising a housing, a sleeve mounted in said housing and adapted to turn therewith, ratchets mounted in said sleeve to turn therewith and capable of longitudinal movement therein and shafts extending through said housing and into said sleeve and supplied with ratchets engaging said first-mentioned ratchets, whereby said shafts are driven.

3. A differential gearing, comprising a housing, a sleeve mounted in said housing to turn therewith and having a limited longitudinal movement therein, a pair of shafts extending into said housing from opposite ends and provided with ratchets adapted to turn therewith, ratchets slidably mounted in said sleeve and turning therewith and coacting with said first-mentioned ratchets to impart motion thereto, and means to drive said housing.

4. A differential gearing, comprising a housing, a sleeve mounted within said housing and adapted to have a limited rotary and longitudinal movement therein, interengaging means on said housing and sleeve to cause said movement, a pair of shafts extending through said housing and into said sleeve from opposite ends, double-faced ratchets mounted in said sleeve and connected with said shafts to cause their revolution, a pair of ratchets adapted to coact with each of said double-faced ratchets and connected with said sleeve to be revolved thereby, means to cause the engagement of one ratchet of each pair with said double-faced ratchets, means to disengage the other ratchet of each pair from said double-faced ratchets, and means to revolve said housing.

5. A differential gearing, comprising a revoluble housing, provided with a series of helical slots, a sleeve mounted in said housing and provided with lugs engaging said slots whereby said sleeve may be given a limited longitudinal and rotary movement, a pair of double-faced ratchets loosely mounted in said sleeve and having hubs, a pair of ratchets mounted on opposite sides of each of said double-faced ratchets and turning on said hubs, means for connecting said ratchets with said sleeve so as to give them a limited longitudinal movement toward and from said double-faced ratchets, and means for holding said ratchets in operative relation to the ratchet-moving means of said sleeve whereby engagement and disengagement of one or the other of the ratchets of each of said pairs of ratchets will be caused by the movement of said lugs in said slots.

6. A differential gearing, comprising a revoluble housing having helical slots around its periphery, a sleeve mounted in said housing and having lugs engaging said slots whereby it is given a limited longitudinal and rotary movement, and also provided with longitudinal grooves, a pair of double-faced ratchets mounted to turn in said sleeve and having hubs, a pair of ratchets mounted on the hubs of each of said double-faced ratchets and having splines engaging the grooves in said sleeve, a pair of shafts extending through said housing and into said sleeve at opposite ends and engaging the hubs of said double-faced ratchets to turn therewith, stops in said grooves, and springs adapted to force said pairs of ratchets into engagement with said stops whereby when said lugs travel in said helical slots one or the other ratchet of each of said pairs of ratchets will engage with one of said double-faced ratchets.

7. The combination of a rotary housing, a sleeve mounted therein and capable of longitudinal movement therein and turning therewith, a divided shaft having its adjacent ends arranged in said sleeve and provided with double-faced ratchets fixed to turn with the shaft, floating ratchets arranged upon opposite sides of said double-faced ratchets, means to engage said floating ratchets with the sleeve to cause them to turn with the sleeve, and means to force one or another of said floating ratchets into engagement with the adjacent double-faced ratchet as the sleeve is caused to turn forwardly or reversely.

8. The combination of a rotary housing, a sleeve mounted therein, a slot and lug connection between the two whereby a combined rotary and endwise movement is imparted to the sleeve in either direction, a divided shaft mounted to turn in said sleeve and having ratchets fixed to turn therewith, and means to turn said shaft in either of two directions, comprising floating ratchets connected to move and turn with the sleeve and springs to exert pressure upon the floating ratchets.

9. The combination of a divided shaft, double-faced ratchets mounted upon adjacent ends of said shaft and turning therewith and having hubs extending laterally therefrom on both faces, ratchets loosely mounted upon said hubs with their teeth adapted to engage the teeth of the double-faced ratchets, means to move such loose ratchets toward the double-faced ratchets, and means to control such movements comprising a longitudinally and rotarily movable sleeve with which the loose ratchets are connected for corresponding movements, and a driven housing with which the sleeve is connected to partake of its movement.

10. The combination of a divided shaft, double-faced ratchets mounted upon adjacent ends of said shaft and turning therewith and having hubs extending laterally therefrom on both faces, ratchets loosely mounted upon said hubs upon opposite sides of the double-faced ratchets with their teeth adapted to engage the teeth of the double-faced ratchets, means to move such loose ratchets toward the double-faced ratchets, and means to control such movements comprising a longitudinally and rotarily movable sleeve with which the loose ratchets are connected for corresponding movements, and a driven housing with which the sleeve is connected to partake of its movement.

11. The combination of a divided shaft, double-faced ratchets mounted upon adjacent ends of said shaft and having the teeth of opposite faces running reversely and provided with laterally extending hubs on both faces and turning with the shaft, ratchets loosely mounted upon said hubs on opposite sides of the double-faced ratchets and having teeth complementary to the teeth on that face of the double-faced ratchets opposite thereto, means to move such loose ratchets toward the double-faced ratchets, and means to control such movements comprising a longitudinally and rotarily movable sleeve with which the loose ratchets are connected for corresponding movements, and a driven housing with which the sleeve is connected to partake of its movement.

12. The combination of a divided shaft, double-faced ratchets mounted upon adjacent ends of said shaft and having the teeth of opposite faces running reversely and provided with laterally extending hubs on both faces and turning with the shaft, ratchets loosely mounted upon said hubs on opposite sides of the double-faced ratchets and having teeth complementary to the teeth on that face of the double-faced ratchets opposite thereto, means to move such loose ratchets toward the double-faced ratchets to effect revolution of the shaft in either of two directions, and means to control the movements of the loose ratchets comprising a longitudinally and rotarily movable sleeve with which the loose ratchets are operatively connected, and a reversibly driven housing with which the sleeve is operatively connected to partake of its movements.

13. The combination of a divided shaft, double-faced ratchets mounted upon adjacent ends of said shaft and having the teeth of opposite faces running reversely and provided with laterally extending hubs on both faces and turning with the shaft, a pair of single-faced ratchets for each double-faced ratchet arranged upon opposite sides thereof and loose upon their hubs and having teeth complementary to the teeth on the double-faced ratchets opposite thereto, means to move the single-faced ratchets in pairs into and out of desired relation to the double-faced ratchets to effect the rotation of the latter forward or reversely, and means to control such movements of the pairs of single-faced ratchets comprising an adjustable sleeve with which the single-faced ratchets are operatively connected, and a reversibly driven housing in which the sleeve is mounted and with which it turns.

In testimony whereof I have hereunto set my hand this 16 day of May, A. D. 1917.

WILLIAM FLORIAN TAYLOR.

Witnesses:
W. MURRAY,
CLYDE MATTHEWS.